US012810003B2

(12) United States Patent
Tanabe

(10) Patent No.: US 12,810,003 B2
(45) Date of Patent: Nov. 24, 2026

(54) INFORMATION PROCESSING APPARATUS, CONTROL METHOD THEREOF, STORAGE MEDIUM, AND INFORMATION PROCESSING SYSTEM

(71) Applicant: CANON KABUSHIKI KAISHA, Tokyo (JP)

(72) Inventor: Akihiro Tanabe, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 541 days.

(21) Appl. No.: 18/461,718

(22) Filed: Sep. 6, 2023

(65) Prior Publication Data

US 2024/0104232 A1 Mar. 28, 2024

(30) Foreign Application Priority Data

Sep. 21, 2022 (JP) ................................ 2022-150530

(51) Int. Cl.
*G06F 21/62* (2013.01)
*G06F 21/60* (2013.01)
*G06N 5/04* (2023.01)

(52) U.S. Cl.
CPC ........ *G06F 21/6209* (2013.01); *G06F 21/602* (2013.01); *G06N 5/04* (2013.01)

(58) Field of Classification Search
CPC ...... G06F 21/6209; G06F 21/602; G06N 5/04
See application file for complete search history.

(56) References Cited

U.S. PATENT DOCUMENTS

| | | | | |
|---|---|---|---|---|
| 9,131,139 | B2 | 9/2015 | Tanabe | |
| 11,463,417 | B2 * | 10/2022 | Yoo | H04L 9/3239 |
| 2020/0184037 | A1 * | 6/2020 | Zatloukal | G06F 21/12 |
| 2024/0154802 | A1 * | 5/2024 | He | G06N 5/04 |
| 2025/0280305 | A1 * | 9/2025 | Yip | G06N 3/063 |

FOREIGN PATENT DOCUMENTS

| | | | | |
|---|---|---|---|---|
| EP | 4276624 | A1 * | 11/2023 | G06F 9/5072 |
| JP | 2019-168590 | A | 10/2019 | |

* cited by examiner

*Primary Examiner* — Matthew T Henning
(74) *Attorney, Agent, or Firm* — Carter, DeLuca & Farrell LLP

(57) ABSTRACT

An information processing apparatus separates data representing an inference network model into first data including information for representing at least a layer configuration of the inference network model, and second data representing coefficient data of each layer. The apparatus generates a first file including the first data and a second file including the second data, and transmits the first file and the second file to an external apparatus. The apparatus generates the first file from data subjected to encryption processing on the first data.

13 Claims, 7 Drawing Sheets

INFORMATION PROCESSING APPARATUS, CONTROL METHOD THEREOF, STORAGE MEDIUM, AND INFORMATION PROCESSING SYSTEM

BACKGROUND OF THE INVENTION

Field of the Invention

The present invention relates to a concealment technique in data communication related to a neural network.

Description of the Related Art

The deep learning technique using a neural network is applied in a wide range of technical fields and, particularly, in classification that recognizes and classifies images, it is said to have exceeded the human ability of recognition. In particular, Convolutional Neural Network (CNN) is widely used because highly accurate deep learning processing can be realized by recursively performing a convolution operation on an image.

In recent years, reflecting the fashion of Social Networking Services (SNS) or the like, security of data such as images is drawing attention. For example, in data sharing services such as SNS, data communication from an edge terminal to a cloud server is indispensable. In general, such data communication is performed by concealing data in order to protect privacy.

For such security measures, also from the viewpoint of protecting the neural network, trained dictionary data is concealed.

According to Japanese Patent Laid-Open No. 2019-168590, for example, it is possible to generate an encrypted learning model by encrypting an inference network model using a first public key, which is a public key of fully homomorphic encryption.

However, using the technique disclosed in Japanese Patent Laid-Open No. 2019-168590 tends to spend much time for decryption processing in execution of inference processing by decrypting an encrypted inference network model, depending on the performance of the inference apparatus.

SUMMARY OF THE INVENTION

In view of the aforementioned problems, an object of the present invention is to provide a technique that allows an inference apparatus to decrypt in higher speed than before even with a same inference network model.

In order to solve the aforementioned issues, one aspect of the present disclosure provides an information processing apparatus that transmits data representing an inference network model to an external apparatus, comprising: a separation unit configured to separate the data representing the inference network model into first data including information for representing at least a layer configuration of the inference network model, and second data representing coefficient data of each layer; a generation unit configured to generate a first file including the first data and a second file including the second data; and a transmission unit configured to transmit the first file and the second file being generated to an information processing apparatus, wherein the generation unit generates the first file from data subjected to encryption processing on the first data.

Another aspect of the present disclosure provides a method of controlling an information processing apparatus that transmits data representing an inference network model to an external apparatus, the method comprising: separating data representing the inference network model into first data including information for representing at least a layer configuration of the inference network model, and second data representing coefficient data of each layer; file generating a first file including the first data, and a second file including the second data; and transmitting the first file and the second file being generated to an information processing apparatus, wherein the file generating generates the first file from data subjected to an encryption processing on the first data.

Still another aspect of the present disclosure provides a non-transitory computer-readable storage medium comprising instructions for performing a method of controlling an information processing apparatus that transmits data representing an inference network model to an external apparatus, the method comprising: separating data representing the inference network model into first data including information for representing at least a layer configuration of the inference network model, and second data representing coefficient data of each layer; file generating a first file including the first data, and a second file including the second data; and transmitting the first file and the second file being generated to the information processing apparatus, wherein the file generating generates the first file from data subjected to encryption processing on the first data.

Yet still another aspect of the present disclosure provides an information processing system comprising an information processing apparatus that generates an inference network model and an inference apparatus that receives data representing the inference network model from the information processing apparatus and executes inference processing, the information processing apparatus including a separation unit configured to separate the data representing the inference network model into first data including information for representing at least a layer configuration of the inference network model, and second data representing coefficient data of each layer, a generation unit configured to generate a first file including the first data and a second file including the second data, and a transmission unit configured to transmit the first file and the second file being generated to an information processing apparatus, wherein the generation unit generates the first file from data subjected to encryption processing on the first data, and the inference apparatus including a reception unit configured to receive the first file and the second file from the information processing apparatus, a reproduction unit configured to generate the first data by decrypting an encrypted data portion of the first file being received, and reproduce the inference network model by extracting a data portion of the second file as the second data, and an inference unit configured to perform inference processing using the inference network model reproduced by the reproduction unit.

According to the present invention, it is possible to improve the processing speed in decryption of an inference network model in an apparatus that receives the inference network model.

Further features of the present invention will become apparent from the following description of exemplary embodiments (with reference to the attached drawings).

DESCRIPTION OF THE EMBODIMENTS

Figure 1:
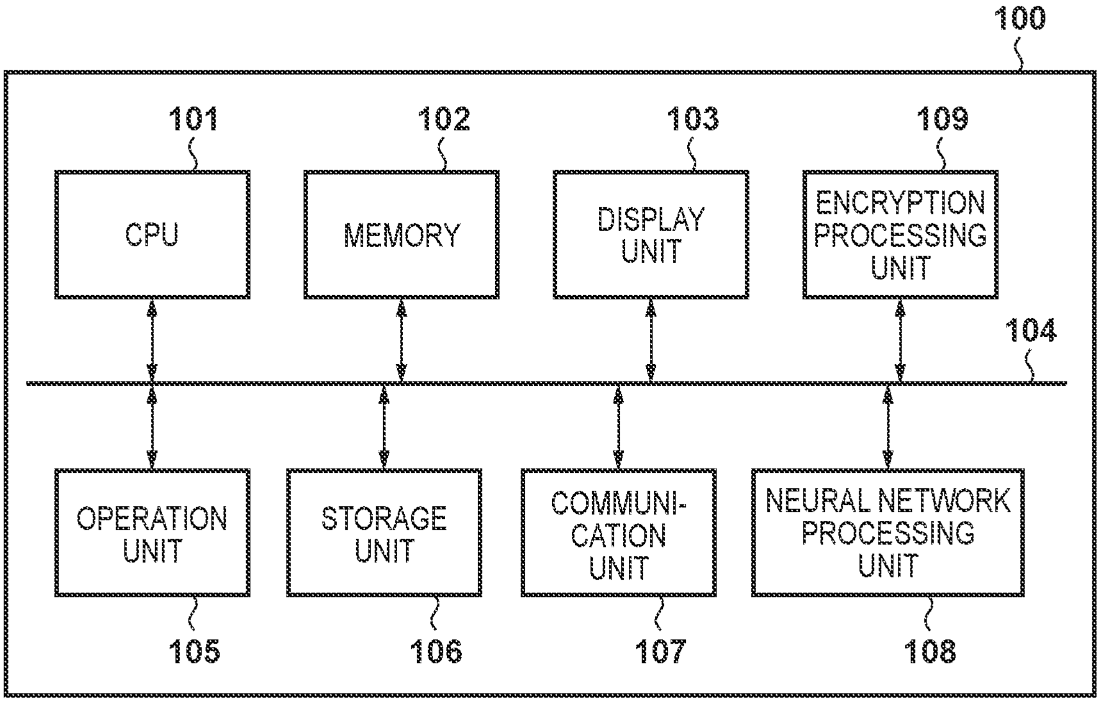
FIG. 1 is a block diagram of a configuration of an information processing apparatus according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram of a configuration of an information processing apparatus 100 according to a first embodiment.

The information processing apparatus 100 includes a CPU 101, a memory 102, a display unit 103, an internal bus 104, an operation unit 105, a storage unit 106, a communication unit 107, a neural network processing unit 108, and an encryption processing unit 109.

The CPU 101 controls all the processing blocks included in the information processing apparatus by executing computer programs stored in the storage unit 106.

The memory 102 is a memory mainly used as a work area of the CPU 101, or a temporary data buffer area.

The display unit 103 performs rendering processing (rendering of a GUI screen) in accordance with an instruction from the CPU 101, and performs output to a display device of a liquid crystal panel or an organic EL panel.

The internal bus 104 is a bus configured to connect each of the processing blocks in the information processing apparatus to each other.

The operation unit 105, includes a keyboard, a mouse, a button, a touch panel, a remote controller, and the like, and is configured to accept operation instructions from a user. The operation information input from the operation unit 105 is transmitted to the CPU 101, and the CPU 101 executes control of each processing block based on the operation information.

The storage unit 106, which includes a storage medium, is a processing block that stores and reads various data to and from the storage medium based on instructions from the CPU 101. The storage medium includes, for example, an EEPROM, a built-in flash memory, a built-in hard disk, or a detachable memory card and the like. Here, it is assumed that the storage unit 106 according to the embodiment stores input data and supervisory data that are data for learning of the neural network processing unit 108.

The communication unit 107 is typically a network interface and is configured to perform communication with an external apparatus. Here, the communication can be performed by wireless or wired, the communication unit 107 is assumed to be a wireless LAN interface in the embodiment. The wireless LAN interface is an interface conforming to an IEEE 802.11n/a/g/b scheme, for example. The communication unit 107 is connected to an external access point via a wireless LAN, and performs wireless LAN communication with other wireless communication devices via the access point. The communication unit 107 can also be connected to other devices via a serial cable such as a USB. The communication unit 107 communicates with external apparatuses including an inference apparatus, and exchanges information such as images and control data, learning data, supervisory data, models, concealment models, decryption models, or the like.

The neural network processing unit 108 performs learning processing of the neural network using the data for learning and the supervisory data stored in the storage unit 106, and a program in which a configuration of a neural network model created in advance is described. The learning data, the dictionary data, and the model separately received from the communication unit 107, or stored in the storage unit 106 may be used. The neural network processing unit 108 includes a GPU and a Digital Signal Processor (DSP). Any type of processing may be target processing of the neural network processing unit 108, the target processing however is assumed to be, for example, classification processing of a subject (person, cat, etc.) in an image. Alternatively, the learning processing of the neural network may be performed by the CPU 101 without providing the neural network processing unit 108, or may be realized as joint processing performed by the both. In addition, the inference network model, which is a result of the learning processing performed by the neural network processing unit 108, is also held in the storage unit 106. In addition, the neural network processing unit 108 can also execute inference using the inference network model stored in the storage unit 106 and the input data for inference.

The encryption processing unit 109 deploys, to the memory 102, the inference network model stored in the storage unit 106, and performs specific encryption processing on a part of the data of the inference network model to generate an encrypted file. In addition, a public key and a private key may be exchanged via the communication unit 216, or may be preliminarily shared between the information processing apparatus 100 and an inference apparatus 200. In addition, data encryption may be either asymmetric encryption or symmetric encryption. Here, the encryption processing is a known technique, and therefore description thereof will be omitted here.

Figure 2:
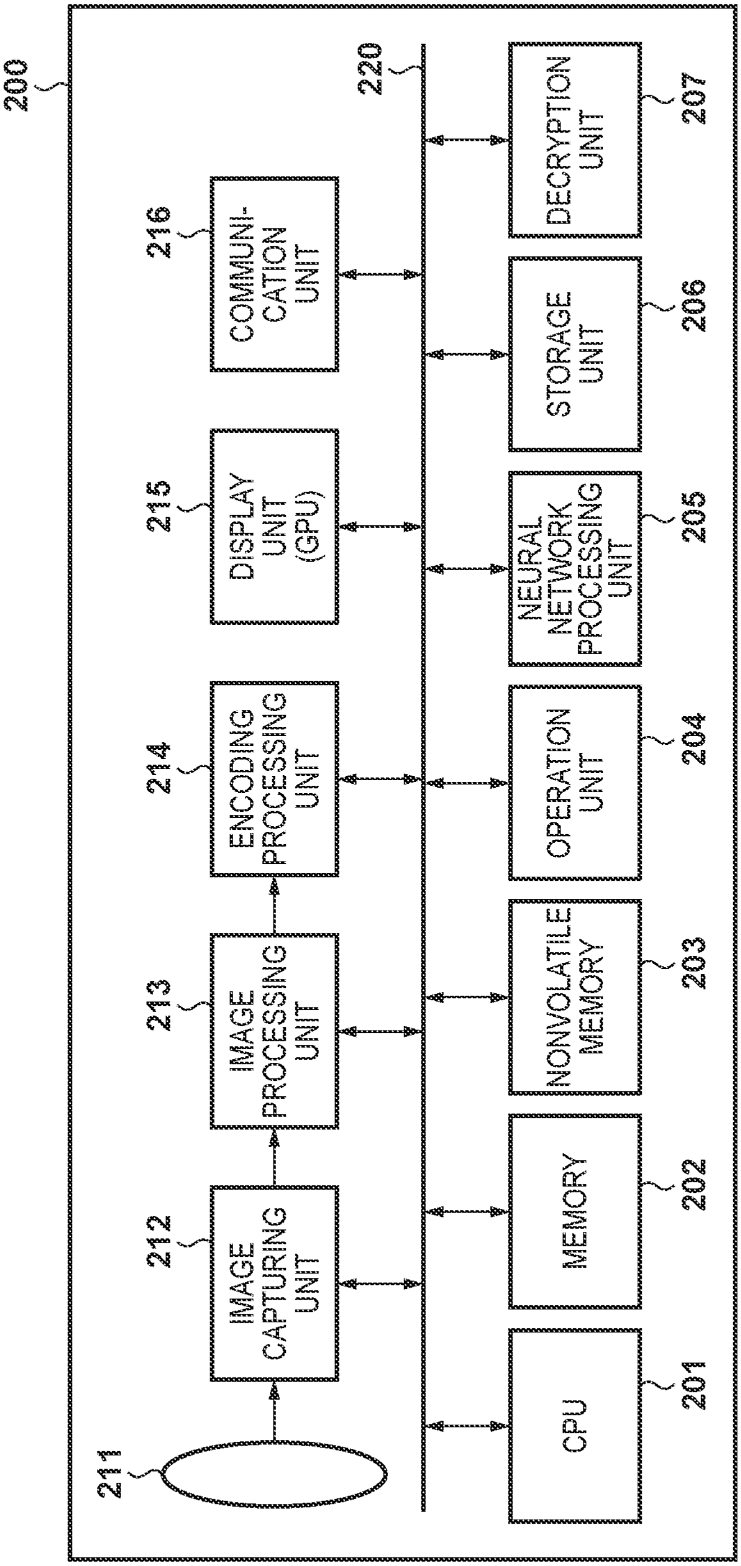
FIG. 2 is a block diagram of a configuration of an inference apparatus according to the present embodiment.

FIG. 2 is a block diagram of a configuration of the inference apparatus 200 according to an embodiment. In the embodiment, an example of applying the inference apparatus 200 to an apparatus having an image capturing function, such as a digital camera will be described.

As illustrated in FIG. 2, the inference apparatus 200 includes a CPU 201, a memory 202, a nonvolatile memory 203, an operation unit 204, a neural network processing unit 205, a storage unit 206, a decryption unit 207, a lens 211, an image capturing unit 212, an image processing unit 213, and an encoding processing unit 214. Furthermore, the inference apparatus 200 includes a display unit 215, a communication unit 216, and an internal bus 220.

The CPU 201 controls operations of each part (each functional block) of the inference apparatus via the internal bus 220 by executing computer programs stored in the non-volatile memory 203.

The memory 202 is a rewritable nonvolatile memory. The memory 202 temporarily stores computer programs for controlling the operation of each unit of the inference apparatus, information such as parameters related to the operation of each unit of the inference apparatus, a model received by the communication unit, a concealment model, miscellaneous information and the like. In addition, the memory 202 temporarily stores images acquired by the image capturing unit 212, and images and information processed by the image processing unit 213, the encoding processing unit 214 or the like. The memory 202 has a sufficient storage capacity for temporarily storing them.

The non-volatile memory 203 is an electrically erasable and writable memory, for which an EEPROM, a hard disk or the like is used. The non-volatile memory 203 stores computer programs for controlling the operations of each part of the inference apparatus and information such as parameters related to the operations of each part of the inference apparatus. Various operations performed by the inference apparatus 200 are realized by such computer programs. Furthermore, the nonvolatile memory 203 can hold a plurality of models and concealment models used by the neural network processing unit 205.

The operation unit 104 provides a user interface configured to operate the inference apparatus.

The neural network processing unit 205 executes neural network processing using an inference network model created in advance. Here, the neural network processing is configured by including, for example, a Convolutional Neural Network (CNN) and a fully connected layer, the neural network processing is not limited thereto. The aforementioned trained coefficient parameters correspond to, in the case of a fully connected layer, a weight coefficients and bias values for each edge connecting nodes in each layer, and correspond to, in the case of a CNN, kernel weight coefficients and bias values. In addition, the neural network processing unit 205 includes a temporary storage area for temporarily storing weight coefficients and bias values. Further, the neural network processing unit 205 has a function of decoding the input data and the trained coefficient parameters that are compressed.

The storage unit 206 controls writing and reading to and from the storage medium under the control of the CPU 201. For example, captured image data is stored in a storage medium. For example, a non-volatile memory, a magnetic disk and the like is used for the storage medium.

The decryption unit 207 performs decryption of data encrypted by a predetermined encryption scheme, on an encrypted file, in the inference network model deployed in the memory 202. Encryption may also be realized by preliminarily exchanging the private key and the public key via the network processing unit 205.

An imaging lens (lens unit) 211 includes a lens group (not illustrated) including a zoom lens, a focus lens or the like, a lens control unit (not illustrated), a diaphragm (not illustrated), or the like.

As the image capturing unit 212, an area image sensor of a Charge-Coupled Device (CCD), a Complementary Metal Oxide Semiconductor (CMOS) element or the like is used, and an optical image of a subject is converted to an electrical signal. The image capturing unit 212 has the ability to capture images at a rate of 30 frames per second, for example, and can capture motion images and still images.

The image processing unit 213 performs predetermined image processing on image data output from the image capturing unit 212, or image data read from the memory 202.

The encoding processing unit 214 compresses the size of the image data by subjecting the image data to intra-frame prediction encoding (intra-screen prediction encoding), inter-frame prediction encoding (inter-screen prediction encoding), or the like.

The display unit 215 generates a displayable image and outputs the generated image to a display screen. The display unit 215 has an On Screen Display (OSD) function that is a function to display a setting screen such as a menu on the display screen. The display unit 215 includes a liquid crystal display, an organic EL display, or the like.

The communication unit 216 is controlled by the CPU 201. The communication unit 216 is configured to generate a modulated signal conforming to a wireless communication standard such as IEEE 802.11, output the modulated signal, and receive a modulated signal from an external apparatus. In addition, the communication unit 216 may control a wired LAN or a USB connected by a wired cable. In addition, the communication unit 216 can transmit and receive control signals of video signals. For example, video signals conforming to a communication standard such as High Definition Multimedia Interface (HDMI, trade name) or Serial Digital Interface (SDI) may be transmitted. Each of the functional blocks are accessible to each other via the internal bus 220.

Figure 3:
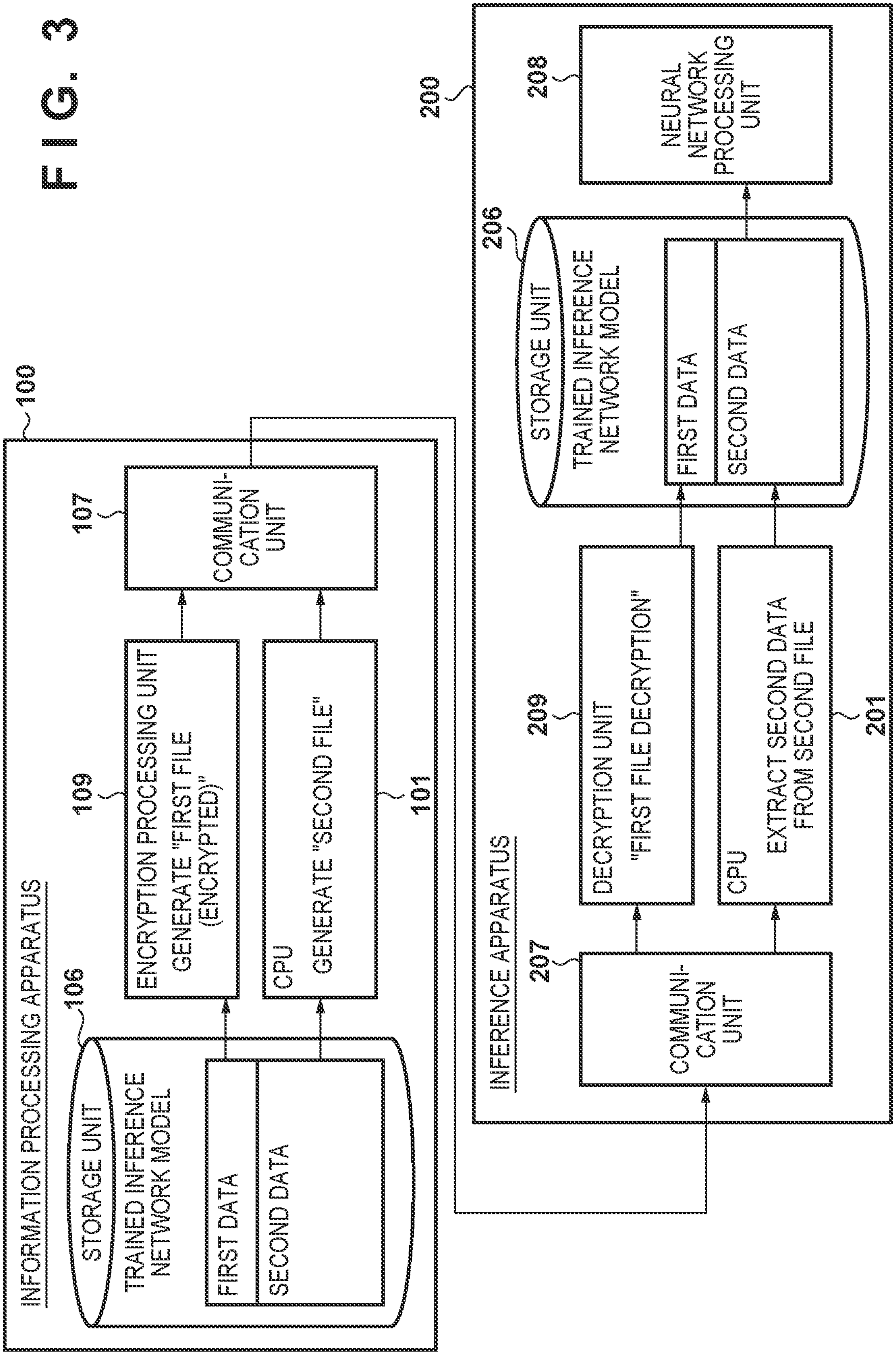
FIG. 3 is a diagram illustrating an example of a system configuration of an information processing apparatus and an inference apparatus according to the present embodiment.

FIG. 3 is a functional configuration diagram of a system of the information processing apparatus 100 and the inference apparatus 200 configured to perform concealment in the present embodiment.

It is assumed that the information processing apparatus 100 and the inference apparatus 200 are communicably connected to each other via the communication units 107 and 207. Here, the communication units 107 and 207 may be in any form as long as they can communicate with each other, each of them may be configured by Wi-Fi (IEEE 802.11 standard) that is wireless communication, or wired Local Area Network (LAN) or Universal Serial Bus (USB) that are wired communication, or the like.

The information processing apparatus 100 separates (divides) the inference network model preliminarily stored in the storage unit 106 as already trained, into first data and second data (the first data and the second data will be described later referring to FIGS. 4A to 4D). The information processing apparatus 100 then causes the encryption processing unit 109 to perform the encryption processing on the first data and adds an appropriate header thereto to generate a first file. The information processing apparatus 100 then causes the CPU 101 to add an appropriate header to the second data, and generates a second file. In generation of the second file from the second data, the encryption processing unit 109 may perform encryption that has a lower encryption strength and can be decrypted in higher speed than for the first data. The information processing apparatus 100 controls the communication unit 107 to transmit the first file and the second file being generated to the inference apparatus 200.

The inference apparatus 200 controls the communication unit 207 to receive the first file and the second file from the information processing apparatus 100. The inference apparatus then controls the decryption unit 209 to perform decryption processing on the received first file to restore the original first data, and stores the restored first data in the storage unit 206. In addition, when the received second file is an unencrypted data, the inference apparatus 200 controls the CPU 201 to extract the original second data from the second file and store the extracted second data in the storage unit 206. Alternatively, when the second file is an encrypted data, the inference apparatus 200 controls the decryption unit 209 to decrypt the second file into the original second data and store the decrypted second data in the storage unit 206. The inference apparatus 200 generates an inference network model from the first data and the second data, and the neural network processing unit 208 performs inference processing.

FIGS. 4A to 4D illustrate examples of data of an inference network model according to an embodiment of the present invention.

Figure 4A:
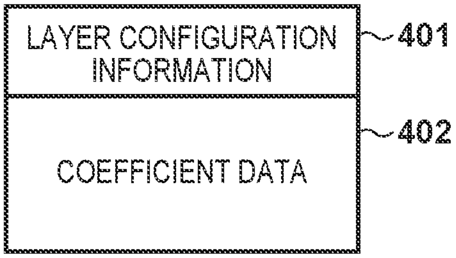
FIGS. 4A and 4B are diagrams illustrating examples of data structures of an inference network model in the present embodiment.

FIG. 4A illustrates an exemplary case where the data of the inference network model is constituted by a single file. There is an .onnx file used in Open Neural Network Exchange (ONNX) as an example of data constituted by a single-file. As illustrated in FIG. 4A, the inference network model includes layer configuration information 401 and coefficient data 402. The layer configuration information 401 is information indicating what types of layers are existing in the neural network of the inference network model and how the layers are connected. The layer configuration information 401 also includes the header of the file. The coefficient data 402 is information such as weight coefficients and bias coefficient values, which are parameters of each layer.

Figure 4B:
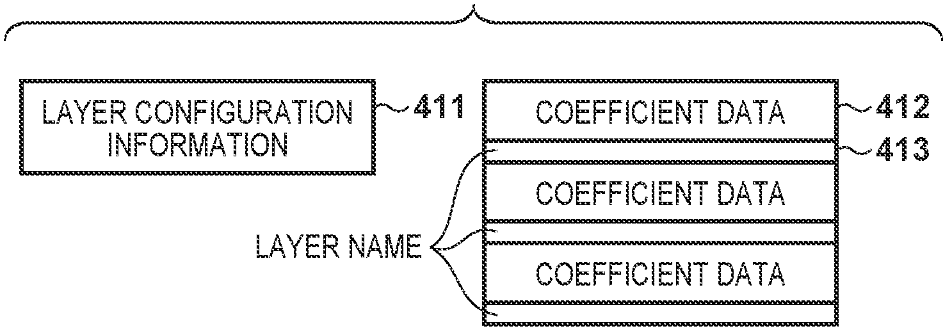

FIG. 4B illustrates an exemplary case where the data is constituted by two files. There are a .prototxt file and a .caffemodel file used in Convolutional Architecture for Fast Feature Embedding (Caffe) as the examples of data format constituted by two files. As illustrated in the FIG. 4B, the inference network model is divided into a file storing layer configuration information 411 indicating what types of layers are existing in the network and how the layers are connected, and a file storing coefficient data 412 being information such as weight coefficients and bias coefficient values, which are parameters of the layers, and data of layer names 413 indicating the layer to which the coefficient data corresponds.

Figure 4C:
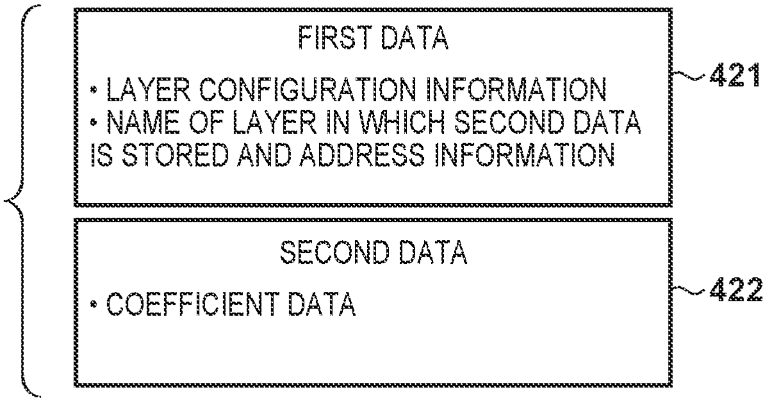
FIG. 4C is a diagram illustrating an example of a data structure of an encrypted inference network model.

FIG. 4C illustrate an exemplary case where the inference network model according to the embodiment is divided into first data 421 to be subjected to the encryption processing, and second data 422 not to be subjected to the encryption or to be subjected to encryption processing with a weaker strength than the first encryption. The first data 421 stores layer configuration information and address information indicating which coefficient data stored in the second data 422 corresponds to which layer. In addition, the second data 422 stores the coefficient data.

Figure 4D:
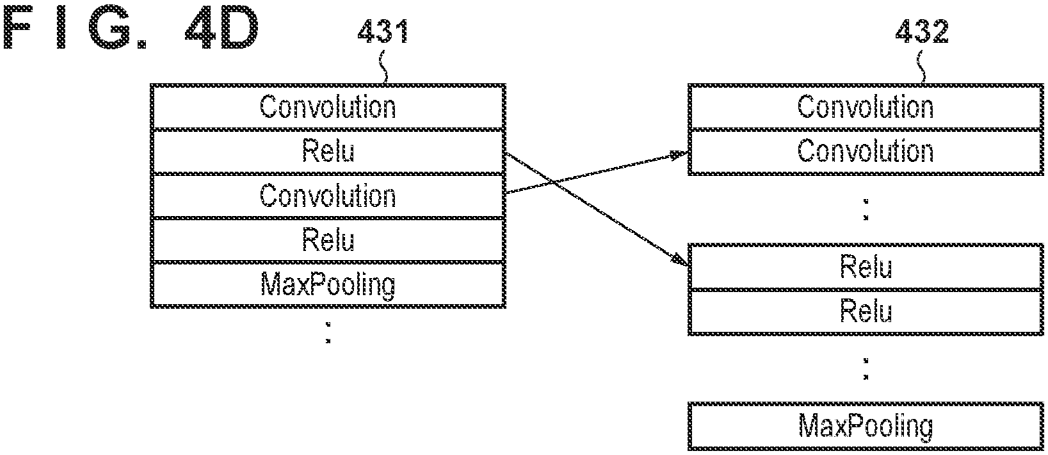
FIG. 4D is a diagram illustrating an example of conversion processing in encryption of a data structure of an inference network model.

FIG. 4D illustrates an exemplary case of converting data of the second data 422. When a Convolution layer and a nonlinear layer such as Relu are arranged side-by-side as illustrated by data before conversion 431 in FIG. 4D, the boundary between layers is easily recognized from the arrangement of the binary data. In the embodiment, therefore, data is converted as converted data 432 by connecting similar layers or layers having the same attribute to each other such that the boundary between the layers cannot be easily distinguished. Here, information for restoring the data of each layer to the original order is included in the first data when the layer data is rearranged. Additionally, in this case, the conversion information for restoring the data of each layer to the original order is desirably stored at or near the top of the first data. It is time consuming to complete the decryption processing of the first data. However, when the inference apparatus 200 can decrypt the conversion information, which is referred when the data of each layer of the second data is restored to the original data, at the initial stage of decryption of the first data, the inference apparatus 200 can start the processing of restoring the data of each layer of the second data to the original order at that timing, without waiting for completion of decryption of the first data. As a result, the time required for decryption processing of the entire neural network can be reduced.

Figure 5:
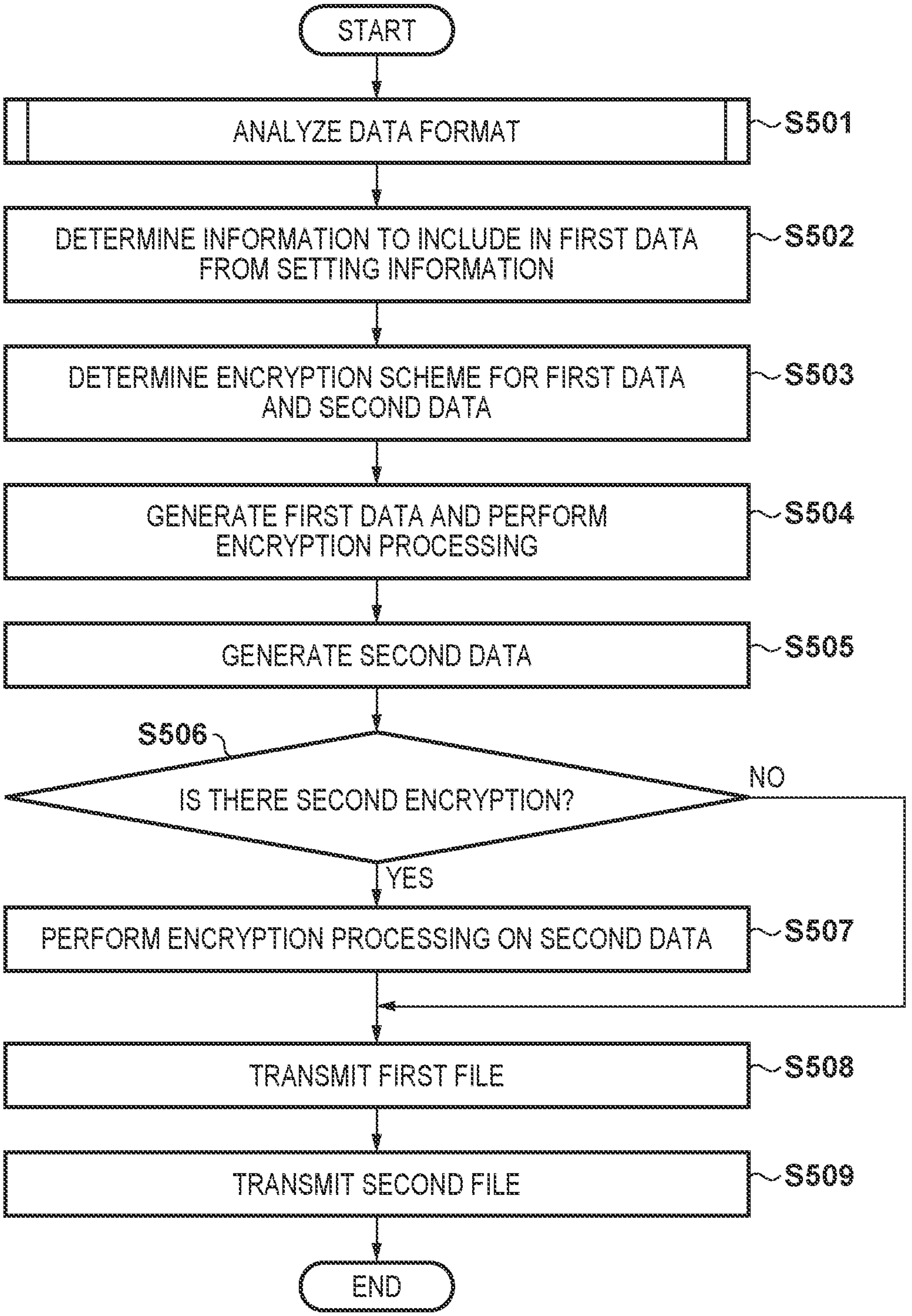
FIG. 5 is a flowchart illustrating an example of a processing method in an information processing apparatus according to the present embodiment.

FIG. 5 is a flowchart illustrating an example of the processing of the information processing apparatus 100 according to the embodiment. This operation is realized by a computer program stored in the storage unit 106 being deployed to the memory 102 and the CPU 101 reading and executing the computer program stored in the memory 102, in a state where the information processing apparatus 100 is powered on.

Figure 6:
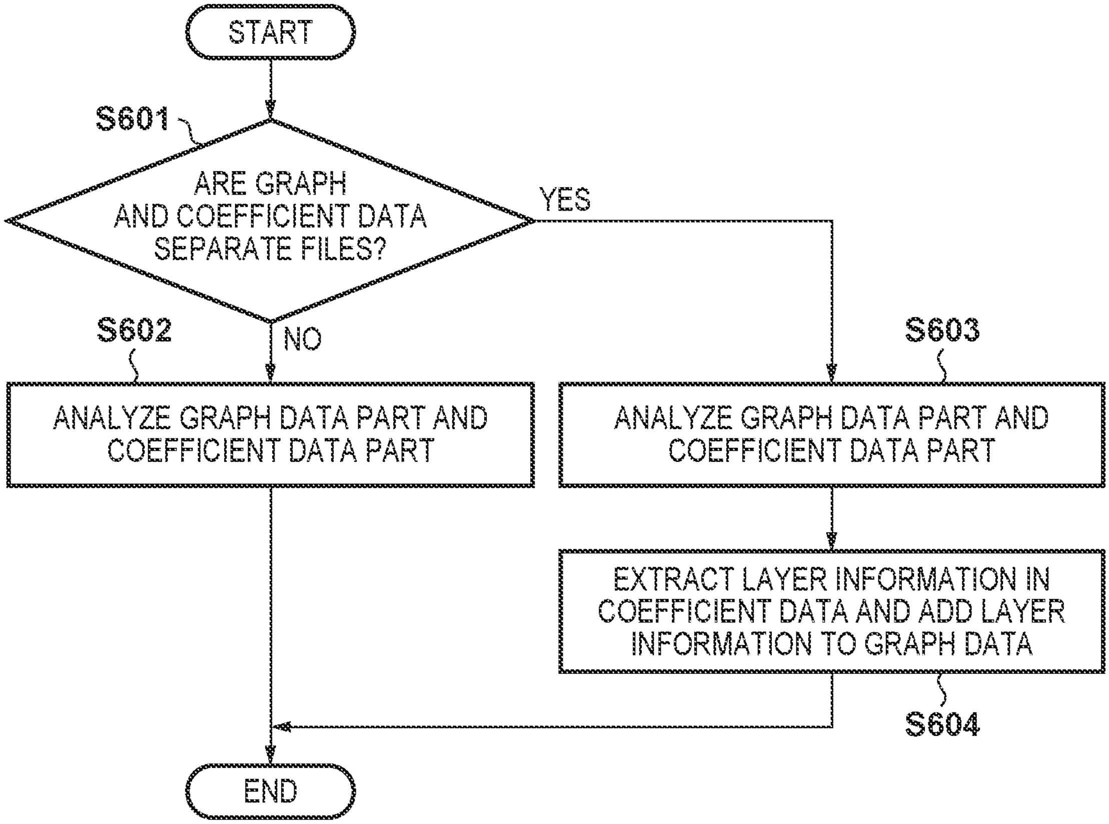
FIG. 6 is a flowchart of format analysis processing in the information processing apparatus according to the present embodiment.

At S501, the CPU 101 analyzes the data format of the inference network model (details will be described later, referring to FIG. 6). The CPU 101 then advances the processing from S501 to S502.

At S502, the CPU 101 deploys, from the storage unit 106 to the memory 102, setting information which has been preliminarily set via the operation unit 105 and, in accordance with the setting information, determines the data to be included in the first data described above referring to FIG. 3 and to be subjected to the encryption process. For example, although all the coefficient data are included in the second data in configurations of FIGS. 4A to 4D, some of the layers may be included in the first data. The CPU 101 then advances the processing from S502 to S503.

At S503, the CPU 101 interrogates the inference apparatus 200, via the communication unit 107, about the encryption scheme for the first data and the second data. Upon receiving a response from the inference apparatus 200, the CPU 101 can acquire the type of encryption that can be decrypted by the decryption unit 207 of the inference apparatus 200. The CPU 201 determines the type of encryption (for example, encryption with the highest encryption strength) for performing encryption of the first data. The CPU 201 also determines whether or not to perform encryption of the second data and, when encryption of the second data is performed, the type of encryption (type with less amount of computation than encryption of the first data). The CPU 101 then advances the processing from S503 to S504.

At S504, the CPU 101 extracts a part to be the first data from the inference network model, and controls the encryption processing unit 109 to perform encryption processing of the type previously determined. The CPU 101 stores the encrypted first data in the storage unit 106 as a first file. The CPU 101 then advances the processing from S504 to S505.

At S505, the CPU 101 performs data conversion processing by setting the data that has not been included in the first data at S504 among the inference network model as the second data, and stores the result in the storage unit 106 as a second file. The data conversion refers to rearranging processing such as that described in FIG. 4D. Here, the first data also includes conversion information relating to rearrangement for restoring the data before processing illustrated in FIG. 4D. Alternatively, the conversion processing of the second data may perform processing such as averaging the coefficients by shifting bits of each coefficient either to the left or the right, or may perform the processing in FIG. 4D in combination with a bit shift. In performing a bit shift, however, the conversion information to be included in the first data also includes information indicating the number of bits to be shifted. The CPU 101 advances the processing from S505 to S506.

At S506, the CPU 101 determines whether or not to encrypt the second data (data of the second file stored in the storage unit 106) at S503. Upon determining to perform encryption (YES at S506), the CPU 101 advances the processing from S506 to S507. Upon determining not to perform encryption (NO at S506), the CPU 101 advances the processing from S506 to S508.

At S507, the CPU 101 controls the encryption processing unit 109 to perform the encryption processing on the second data. Here, the encryption processing in this case is the encryption with a weaker strength than the encryption used at S504, and with less amount of computation for decryption. The CPU 101 re-stores (overwrites) the encrypted second data as the second file in the storage unit 106. At this time, the CPU 101 includes, in the header of the second file, information specifying the type of encryption and, further, information indicating the existence of the conversion information mentioned in the description of S505. Subsequently, the CPU 101 advances the processing from S507 to S508.

At S508, the CPU 101 controls the communication unit 107 to transmit the first file stored in the storage unit 106 to the inference apparatus 200. The CPU 101 advances the processing from S508 to S509.

At S509, the CPU 101 controls the communication unit 107 to transmit the second file stored in the storage unit 106 to the inference apparatus 200. The CPU 101 terminates the processing in the flowchart at S509.

Next, details of the processing at S501 in FIG. 5 will be described, referring to the flowchart of FIG. 6.

The CPU 101 determines, at S601, to which file formats illustrated in FIGS. 4A and 4B the inference network model corresponds. Upon determining that the inference network model is constituted by a single file as illustrated in FIG. 4A (YES at S601), the CPU 101 advances the processing from S601 to S602. Upon determining that the inference network model is constituted by two or more files as illustrated in FIG. 4B (NO at S602), the CPU 101 advances the processing from S601 to S603.

At S602, the CPU 101 determines the data format of the inference network model from the file extension or the header information, analyzes, and stores in the storage unit 106, the layer configuration information that is graph data and the address information storing coefficient data. The CPU 101 terminates the processing.

At S603, the CPU 101 determines the data format of the inference network model from the file extension, or the file storing header information among a plurality of files, analyzes, and stores the result of analysis in the storage unit 106, the layer configuration information that is graph data and the address information storing coefficient data. The CPU 101 advances the processing from S603 to S604.

At S604, the CPU 101 extracts the data of the layer names 413 described above in FIG. 4B among the coefficient data part analyzed at S603, and adds the extracted data to the first data. The CPU 101 terminates the processing in the flowchart at S604.

Figure 7:
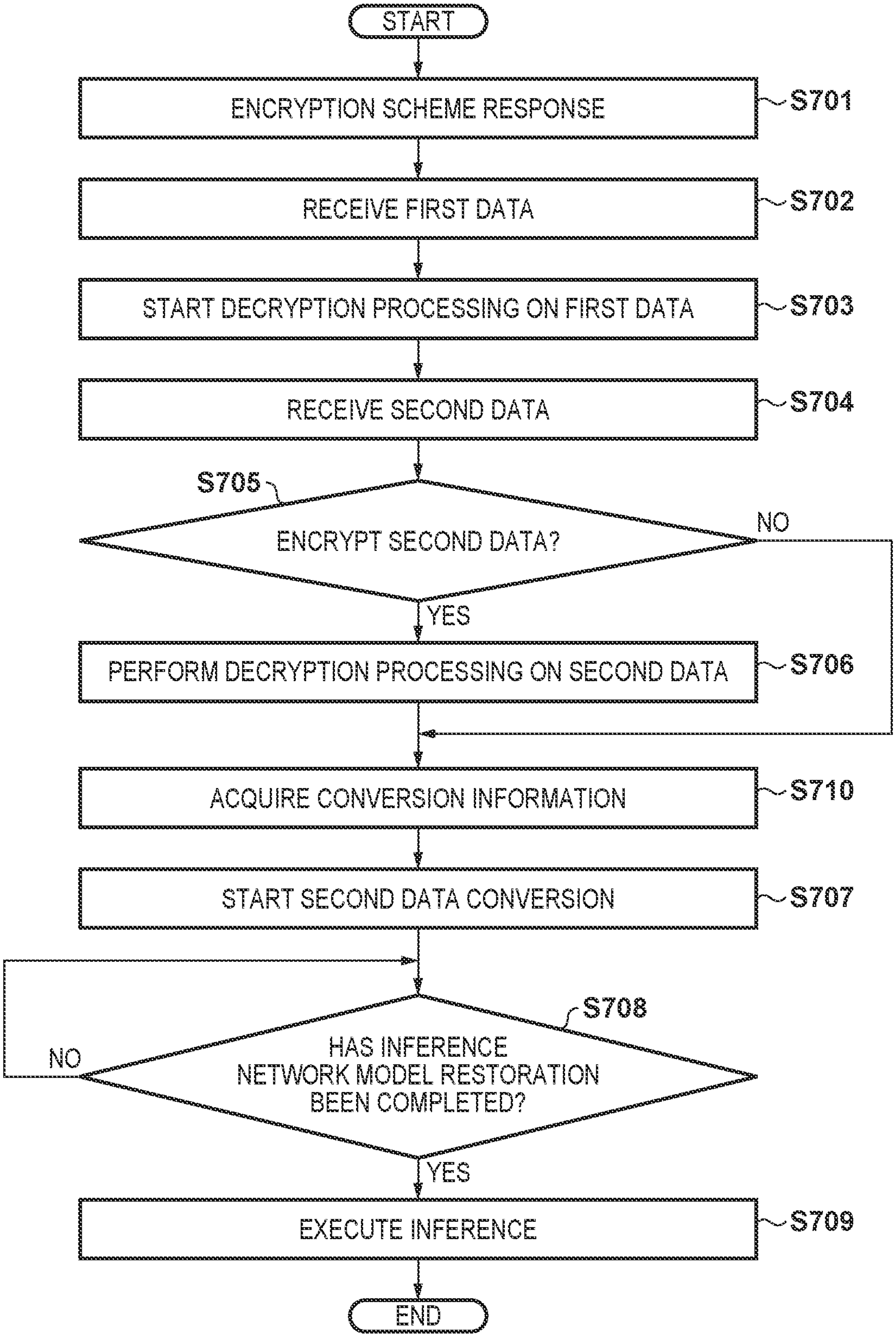
FIG. 7 is a flowchart illustrating an example of inference processing in the inference apparatus according to the present embodiment.

FIG. 7 is a flowchart illustrating a reception and decryption processing of the inference network model in the inference apparatus 200 according to the embodiment. The operation starts when a computer program stored in the storage unit 206 is deployed to the memory 202 and the CPU 201 reads and executes the computer program stored in the memory 202, in a state where the inference apparatus 200 is powered on. It is assumed in the following description that the information processing apparatus 100 has performed the rearrangement processing illustrated in FIG. 4D on the second data.

At S701, the CPU 201 receives an inquiry request for an encryption scheme from the information processing apparatus 100 via the communication unit 216. In response to the inquiry request, the CPU 201 returns, via the communication unit 216, encryption scheme information (information indicating the type of encryption scheme that can be decrypted by the inference apparatus 200) stored in the memory 202. The CPU 201 advances the processing from S701 to S702.

At S702, the CPU 201 receives the first file from the information processing apparatus 100 via the communication unit 216, and stores the first file in the storage unit 206. The CPU 201 advances the processing from S702 to S703.

At S703, the CPU 201 controls the decryption unit 207 to start the decryption processing on the data portion (first data) of the first file stored in the storage unit 206. The first data of the first file has a high encryption strength, which takes a long processing time, and therefore the processing is started prior to reception of the second data. Hereafter, although it is assumed that the processing at the present step is executed in parallel with execution of the processing from S704 to S708, a higher priority is given to processing the data required for restoring the second data. The CPU 201 advances the processing from S703 to S704.

At S704, the CPU 201 receives the second file via the communication unit 216 and stores the second file in the storage unit 206. The CPU 201 advances the processing from S704 to S705.

At S705, the CPU 201 determines whether or not the second file is encrypted. The determination is performed by analyzing the file header, for example. Upon determining that the second data of the second file is encrypted (YES at S705), the CPU 201 advances the processing from S705 to S706. Upon determining that the second data is not encrypted (NO at S705), the CPU 201 advances the processing from S705 to S710.

At S706, the CPU 201 controls the decryption unit 207 to perform the decryption processing on the data portion (second data) of the second file stored in the storage unit 206. The CPU 201 advances the processing from S706 to S710.

At S710, the CPU 201 acquires, through the decryption processing of the first data, conversion information relating to the conversion performed on the second data. Here, the CPU 201 waits for acquisition of the conversion information when the conversion information is not acquired in the decryption processing of the first data. As has been described above, according to the embodiment, the conversion information for the second data is included in the top portion such as the top or the vicinity of the top of the first data, before the encryption of the first data is started. Accordingly, the conversion information can be acquired at the initial stage of the decryption processing of the first data, whereby there can be no, or sufficiently short, waiting time at S710. Upon acquiring the conversion information, the CPU 201 advances the processing from S710 to the S707.

At S707, the CPU 201 performs an inverse conversion processing that restores the second data to the data before processing. For example, in order to perform restoring processing of the data converted at S505 in FIG. 5 to the original data, the data is restored to the state before the bit shift is performed when there is a bit shift, or in a case where the layers have been rearranged, the data is restored to the data before the rearrangement. Additionally, in a case where the layer names 413 have moved from the second data to the first data, processing is performed to return them to the second data. The CPU 201 advances the processing from S707 to S708.

At S708, the CPU 201 determines whether or not both the decryption processing of the first data started at S703 and the conversion processing of the second data are completed, and waits for completion of the both. Upon completion of the processing of decrypting the first data and restoring the second data, the CPU 201 moves data that are unnecessary for the first data to the second data and performs restoration (reproduction) processing of the inference network model. Upon determining that the restoration processing has been completed (YES at S708), the CPU 201 advances the processing from S708 to S709.

At S709, the CPU 201, by using the reproduced inference network model that has been completed in restoration and stored in the storage unit 206, controls the neural network processing unit 205 to execute the desired inference processing (e.g., subject recognition processing). The CPU 201 terminates the processing in the flowchart at S709.

As has been described above, according to the present exemplary embodiment, the inference apparatus 200 can start the inference processing in a shorter time after receiving an encrypted inference network model compared to the case of encrypting all the inference network models.

Although respective embodiments have been described above, the invention is not limited to any particular embodiment and various modifications and variations can be made within the scope defined in the claims. In addition, it is also possible to combine all or a plurality of the components of the aforementioned embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-150530, filed Sep. 21, 2022 which is hereby incorporated by reference herein in its entirety.

What is claimed is:

1. An information processing apparatus that transmits data representing an inference network model to an external apparatus, comprising:

one or more processors configured to cause the information processing apparatus to:

separate the data representing the inference network model into first data including information for representing at least a layer configuration of the inference network model, and second data representing coefficient data;

generate a first file including the first data and a second file including the second data; and transmit the first file and the second file being generated to an information processing apparatus, wherein generate the first file from data subjected to encryption processing on the first data.

2. The information processing apparatus according to claim 1, wherein the one or more processors are further configured to cause the information processing apparatus to determine a format of the inference network model, wherein, data storing the first data is extracted from the inference network model and the first file is generated, based on a result of determination.

3. The information processing apparatus according to claim 1, wherein the second data includes coefficient data of each layer used in inference execution, and the first data includes address information indicating locations where the coefficient data of each layer in the second data is stored.

4. The information processing apparatus according to claim 1, wherein the one or more processors are further configured to cause the information processing apparatus to process the second data, wherein the first data includes information for restoring the data to the data before processing.

5. The information processing apparatus according to claim 4, wherein the one or more processors are further configured to cause the information processing apparatus to shift each coefficient data of the second data by a predetermined number of bits.

6. The information processing apparatus according to claim 4, wherein the information for restoring the data to the data before processing unit is stored in a top portion of the first data.

7. The information processing apparatus according to claim 1, wherein the second file is generated without executing encryption on the second data, or by executing encryption, on the second data, with a lower encryption strength and a smaller amount of computation for decryption than the encryption for the first data.

8. The information processing apparatus according to claim 1, wherein the one or more processors are further configured cause the information processing apparatus to acquire, by communication with the external apparatus, information indicating types of encryption that can be decrypted by the external apparatus, wherein the first file is generated by executing encryption, on the first data, with a highest encryption strength among the types of encryption being acquired.

9. The information processing apparatus according to claim 1, wherein the external apparatus is an inference apparatus configured to receive the first and second files, perform decryption and reproduce the inference network model, and execute inference processing.

10. A method of controlling an information processing apparatus that transmits data representing an inference network model to an external apparatus, the method comprising:

separating data representing the inference network model into first data including information for representing at least a layer configuration of the inference network model, and second data representing coefficient data;

file generating a first file including the first data, and a second file including the second data; and transmitting the first file and the second file being generated to an information processing apparatus, wherein the file generating generates the first file from data subjected to an encryption processing on the first data.

11. A non-transitory computer-readable storage medium comprising instructions for performing a method of controlling an information processing apparatus that transmits data representing an inference network model to an external apparatus, the method comprising:

separating data representing the inference network model into first data including information for representing at least a layer configuration of the inference network model, and second data representing coefficient data;

file generating a first file including the first data, and a second file including the second data; and transmitting the first file and the second file being generated to the information processing apparatus, wherein the file generating generates the first file from data subjected to encryption processing on the first data.

12. An information processing system comprising an information processing apparatus that generates an inference network model and an inference apparatus that receives data representing the inference network model from the information processing apparatus and executes inference processing, the information processing apparatus including a first one or more processors configured to cause the information processing apparatus to:

separate the data representing the inference network model into first data including information for representing at least a layer configuration of the inference network model, and second data representing coefficient data, generate a first file including the first data and a second file including the second data, and transmit the first file and the second file being generated to an information processing apparatus, wherein generate the first file from data subjected to encryption processing on the first data, and the inference apparatus including a second one or more processors configured to cause the inference apparatus to:

receive the first file and the second file from the information processing apparatus, generate the first data by decrypting an encrypted data portion of the first file being received, and reproduce the inference network model by extracting a data portion of the second file as the second data, and perform inference processing using the inference network model reproduced.

13. The information processing system according to claim 12, wherein the first one or more processors further cause the information processing apparatus to:

process the second data, generate a second file from the second data processed, and generate a first file by encryption with storing, in a top portion of the first data, information for restoring the second data to the data before processing, and wherein the second one or more processors further cause the inference apparatus to:

start decryption processing of a data portion of the first file in order to acquire the first data, in response to receiving the first file, and in response to acquiring, by the decryption processing of the data portion of the first file, information for restoring the data to the data before processing, generate, based on the information, the second data by performing processing of restoring the data portion of the second file to the data before processing.

* * * * *